United States Patent Office 3,376,237
Patented Apr. 2, 1968

3,376,237
FOAMED POLYLACTAM CONTAINING SURFACTANT
Mack F. Fuller, Wenonah, N.J., assignor to E. I. du Pont de Nemours and Company, Wilmington, Del., a corporation of Delaware
No Drawing. Filed Feb. 25, 1965, Ser. No. 435,320
10 Claims. (Cl. 260—2.5)

ABSTRACT OF THE DISCLOSURE

Polymerizing lactams to foamed polylactams, e.g., polycaprolactam, under substantially anhydrous conditions in the presence of a lactam-base salt, by adding a cocatalyst capable of promoting polymerization at a temperature below the melting point of the polymer and adding a blowing agent. Polymerization is conducted in the presence of from about 0.15 to 1.5% of a surfactant having the formula $RN(CH_2CH_2COOM)_2$ wherein R is an aliphatic hydrocarbon having from 10 to 20 carbon atoms and M is a salt-forming cation, e.g., the surfactant disodium N-stearyl β-iminodiproprionate.

---

The present invention relates to a novel composition and new process for the manufacture of foamed polylactam and, more particularly, to an anionic polymerization process involving the use of certain surfactants during foaming of lactams and the product resulting therefrom.

The polymerization of lactams, especially ε-caprolactam, has attracted considerable attention within recent years because plastic articles can be made rapidly thereby without the necessity for using injection molding techniques on previously prepared polylactam at temperatures above the melting point of the polylactam. Using rapid polymerization techniques, articles of any size can be formed by injecting a mixture of a lactam, a catalyst, i.e., a lactam-base salt, a cocatalyst, i.e., a polymerization promoter, and a blowing agent, into a mold and heating the mixture below the melting point of the polylactam until polymerization takes place. However, foaming and polymerizing lactams above the melting point of the monomer but below the melting point of the polymer does give rise to certain problems concerning the properties of the resulting polylactam. For example, the cell structure of the foamed polylactam is not uniform; the texture of the surface of the foamed polylactam is rough and the polylactam product does not have a fine cell structure. It has recently been discovered that some of these objections can be overcome by carrying out polymerization and foaming in the presence of a fatty acid alkali metal compound. However, for certain uses these fatty acid alkali metal soaps are not satisfactory because the soap present in the foamed polymer exudes to the surface on standing, thus damaging the appearance, interfering with the paintability, increasing the water sensitivity and lowering the stiffness of the foamed polylactam product and, furthermore, one does not obtain as fine and uniform cell structure as desired.

It has now been discovered that if during polymerization and foaming of a lactam a certain group of surfactants are present the resultant product has, quite unexpectedly, highly superior properties in terms of cell structure and is free from the above mentioned disadvantages using fatty acid alkali metal soaps. The polymerization of lactams to foamed polylactams to make such products involves heating, under substantially anhydrous conditions, a lactam in the presence of a lactam-base salt, adding a cocatalyst capable of promoting polymerization at a temperature below the melting point of the polymer and a blowing agent and conducting polymerization and foaming in the presence of a relatively minor amount, of the order of from about 0.15 to about 1.5 percent, by weight, of a surfactant having the structure $RN(CH_2CH_2COOM)_2$ wherein R is an aliphatic hydrocarbon having from 10 to 20 carbon atoms and M is a salt-forming cation. The foamed polylactam thus formed has improved properties, for example, the cell size is fine and uniform and the surface of the polylactam is smooth, that is, the texture of the skin is much improved, and a much improved appearance is obtained because these particular surfactants do not exude to the surface of the polylactam upon standing.

The surfactants that are used in the present invention are, as pointed out above, represented by the following structural formula:

$$RN(CH_2CH_2COOM)_2$$

wherein R is an aliphatic hydrocarbon having from 10 to 20 carbon atoms and M is a salt-forming cation. Preferably, the aliphatic hydrocarbon contains from 12 to 18 carbon atoms. The aliphatic hydrocarbon can also be substituted with an alkyl hydrocarbon radical. The alkyl group substituted on the aliphatic hydrocarbon chain generally contains from about 1 to 6 carbon atoms, however, alkyl radicals having on the order of up to 20 carbon atoms, can also be used. M represents a salt-forming cation. However, from the standpoint of cost, availability and color, M is preferably an alkali or alkaline earth metal cation, and most preferably an alkali metal cation, for example, sodium, potassium, rubidium, cesium, lithium calcium, strontium, magnesium, barium and beryllium. It is pointed out that M can be hydrogen, however, hydrogen is converted to a metal salt in the polymerization system because said system contains base, for example sodium, in a sufficient amount to replace the hydrogen, in addition to that needed for the formation of the lactam-base salt. When M is other than alkali metal cation at least some of M is replaced by alkali metal cation during polymerization because the alkali metals used in the system are stronger bases.

Representative surfactants, some available under the trademark "Deriphat,"  that are particularly useful in the present invention are, for example:

n-decyl-N-$(CH_2CH_2COONa)_2$
n-undecyl-N-$(CH_2CH_2COOK)_2$
n-dodecyl-N-$(CH_2CH_2COOH)_2$
n-tridecyl-N-$(CH_2CH_2COO)_2Mg$
n-tetradecyl-N-$(CH_2CH_2COO)_2Sr$
n-pentadecyl-N-$(CH_2CH_2COONa)_2$
n-hexadecyl-N-$(CH_2CH_2COOK)_2$
n-heptadecyl-N-$(CH_2CH_2COONa)_2$
n-octadecyl-N-$(CH_2CH_2COONa)_2$
iso-dodecyl-N-$(CH_2CH_2COONa)_2$
iso-tetradecyl-N-$(CH_2CH_2COONa)_2$
iso-octadecyl-N-$(CH_2CH_2COONa)_2$
decadecyl-N-$(CH_2CH_2COONa)_2$
2-ethyl-n-tetradecyl-N-$(CH_2CH_2COONa)_2$
3-propyl-n-hexadecyl-N-$(CH_2CH_2COONa)_2$
4-hexyl-n-decyl-N-$(CH_2CH_2COONa)_2$
5-isoamyl-n-decyl-N-$(CH_2CH_2COONa)_2$
6-cyclohexylmethyl-n-decyl-N-$(CH_2CH_2COONa)_2$ The polymerization process of this invention is effective in producing high molecular weight foamed polylactams. Generally, the anionic polymerization process can be started at temperatures above the melting point of the lactam but below the melting point of the resulting polylactam. In general, this starting temperature range is from about 80° C. to 215° C., particularly from about 130° C. to about 200° C. ε-caprolactam is readily polymerized by the process of this invention starting at temperatures between 140° C. and 160° C. with 150° C. being a convenient starting temperature. During polymerization the reaction mixture is held at least at a temperature of 130° C. but below the melting point of the polycaprolactam.

Any lactam can be used in the process of this invention. However, it is preferable to employ lactams having from 3 to 12 carbon atoms in the lactam ring, and most preferably, 6 to 12 carbon atoms. Representative lactams that can be employed either alone or mixed are, for example: ε-caprolactam, enantholactam, caprylolactam and laurolactam.

The lactam-base salts used as base catalysts in the process of this invention are prepared by the reaction of bases with a lactam. Generally, ε-caprolactam is used for the preparation of such anionic catalysts; but if desired, the anionic catalysts can be prepared from other lactams, preferably, for convenience, the lactam that is to be polymerized is used. The base employed to form the anionic catalyst or lactam-base salt is an alkali metal, an alkaline earth metal, or a basic derivative of one of these metals such as hydroxide, alkoxide, hydride, alkyl, aryl amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, are, for example, suitable bases for the preparation of the anionic catalyst.

The anionic catalyst, that is, the lactam-base salt, is prepared by heating the lactam with a base at a temperature between about 25 and 225° C. The base can be added to the total lactam which is to be polymerized, or alternatively, to a portion of the lactam which is to be polymerized and this portion of the resultant lactam containing the anionic catalyst added to more of the lactam later. If the portion of lactam containing the anionic catalyst is held for long periods before use, it should be kept below 125° C. to prevent premature polymerization. The time required for preparing the lactam-base salt varies from a few seconds to several hours and depends upon a number of variables, for example, the strength of the base employed, the proportion added, and the temperature chosen. Preferably, the lactam and the base should be substantially anhydrous. Generally, the amount of the base charged is between about 0.1 mole percent and about 5.0 mole percent of the total lactam used, and the preferred range is between about 0.7 mole percent and about 1.5 mole percent.

Any cocatalyst compound capable of causing polymerization of the lactam above the melting point of the monomer and below the melting point of the polymer can be used in this invention. The cocatalysts or promoter compounds are usually derived from organic and inorganic acids of particular types. Effective cocatalysts are acyl compounds, i.e., compounds having the structure C-X wherein X can be sulfur, oxygen or nitrogen, the unsatisfied valences of carbon being substituted with any organic radical, preferably not having more than twenty carbon atoms. Representative of the acyl compounds that can be used as cocatalysts are, for example, acyl halides, anhydrides, imides, organic isocyanates, ketenes, alpha-halogenated ketones, N-acetyl caprolactam and substituted ureas. Specifically desirable are N-substituted imides having the structural formula

wherein A is a radical such as carbonyl, thiocarbonyl, imino, sulfonyl, phosphinyl, and thiophosphinyl radicals, B is a radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tetramino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto.

Other acyl cocatalyst compounds that are suitable for use in the present invention are further described in British Patent 863,859 published Mar. 29, 1961, British Patent 872,328 published July 5, 1961, British Patent 842,576 published July 27, 1960, Australian Patent 218,129 published Jan. 16, 1958, Australian Patent 228,445 published May 8, 1958, Australian Patent 231,825 published Oct. 22, 1959, German Patent 1,067,591 published Oct. 22, 1959, German Patent 1,067,587 published Oct. 22, 1959, Belgian Patent 592,979 published Jan. 16, 1961.

Other cocatalysts that are particularly suitable are aromatic carbonate esters having at least one carbocyclic aromatic group attached to the carbonate, (e.g., the polycarbonate of 4,4'-dihydroxydiphenyl-2,2-propane) which is the subject of copending application Ser. No. 242,895, filed Dec. 7, 1962, now Patent No. 3,207,713 and assigned to the assignee of the present application. Still another desirable cocatalyst is 2,2,4-trimethyl-3-hydroxy-3-pentenoic acid β-lactone, which is the subject of copending application Ser. No. 229,161, filed Oct. 8, 1962, now Patent No. 3,214,415 and assigned to the assignee of the present application. The acyl-bis heterocyclic compounds (e.g., sebacoyl-bis pyrazole) disclosed in copending application Ser. No. 266,810 which was filed on Mar. 21, 1963, now Patent No. 3,206,418 and assigned to the assignee of the present application, are also desirable cocatalysts. The triazine derivatives (e.g., the caprolactam derivatives of triazines) disclosed in copending application Serial No. 155,791, which was filed on Sept. 5, 1961 and was assigned to the assignee of the present application, is still another desirable class of cocatalysts, also diphenyl carbamyl heterocyclic compounds (e.g., diphenylcarbamylimidazole) disclosed in copending application Ser. No. 274,803 filed Apr. 22, 1963, now Patent No. 3,274,132 are suitable cocatalysts that may be employed in this invention.

Representative examples of cocatalysts which can be used in the process of this invention are:

2,2,4,4-tetramethylcyclobutanedione
2/1 adduct of ε-caprolactam and 2,4-toluenediisocyanate
2/1 adduct of ε-caprolactam and hexamethylenediisocyanate
2/1 adduct of ε-caprolactam and 4,4'-methylenebis (phenylisocyanate)
3/1 adduct of ε-caprolactam and 1,4-xylene-2,4,6-trisocyanate
N,N'-carbonyl-biscaprolactam
N,N'-oxalylbiscaprolactam
N,N'-azeloylbiscaprolactam
1-diphenylcarbamylimidazole
1-diphenylcarbamylpyrazole
1-diphenylcarbamyl-1,2,4-triazole
1-diphenylcarbamylbenzimidazole
1-diphenylcarbamylbenzo-1,2,3-triazole
 diphenyl carbonate
poly[2,2-propanebis(4-phenyl carbonate]
diethyleneglycolbis(phenyl carbonate)
polymers of the formula $-(CF_2S)_x-$ where $x$ is 3000 to 6000.

The cocatalyst or polymerization promoter is uesd in proportions varying from about 0.15 mole percent to about 0.6 mole percent of the total lactam used, and preferably is from about 0.2 mole percent to about 0.5 mole percent.

Any blowing agent can be used in the process of this invention. Satisfactory blowing agents are thermally unstable gases, liquids and solids which are soluble in and compatible with the constituents of the catalyzed lactam composition at mixing temperature, which do not interfere with the polymerization of the lactam and which subsequently disengage from the lactam composition in gaseous form at the increased temperature produced by the polymerization exotherm. "Blowing agents" as used herein refers to unstable compounds which decompose when heated to give off a gas, usually nitrogen, which is dispersed in the polymer to lower its density or to low boiling liquids which vaporize at polymerization temperatures. The blowing agents employed in this process volatilize or decompose within the polymerization reaction temperature, that is, above the melting point of the lactam and below the melting point of the polymer, usually between about 80° C. and 215° C. The amount of blowing agent employed in the process can vary but generally is used in amounts from 0.5 to 15 percent, by weight. Representative compounds are, for example, propane, butane, hexane, heptane, octane, nonane, benzene, cyclohexane, trioxane and hexene-1. Chemical blowing agents which are solids and soluble or dispersible in the lactam mixture are also suitable. For example, azo compounds such as $\alpha,\alpha'$-azobis(isobutyro nitrile) and $\alpha,\alpha'$-azobis(cyclohexane carbonitrile) are effective blowing agents. In addition, diazirines are also useful as blowing agents, for example, cyclohexane-2-spirodiazirine. Particularly effective blowing agents include, for example, azides having an azidomethyl group bonded to an unsaturated atom. Aliphatic acids having 8 to 24 carbon atoms and benzyl acids and especially alkyl substituted azides having an azidomethyl group bonded to an unsaturated atom. Aliphatic acids having 8 to 24 carbon atoms and benzyl acids and especially alkyl substituted azides having 8 to 18 carbon atoms are particularly effective. These azides and their method of preparation are described in assignee's copending application Ser. No. 171,356 filed Feb. 6, 1962, now Patent No. 3,236,789.

The blowing agent, for example, an allylic azide, is generally added just before initiating polymerization. They should not be exposed to high temperatures in the presence of basic catalysts for extended periods because they lose gas. The blowing agents can be, for example, added to a portion of molten lactam containing the cocatalyst mixture just before this portion is mixed with the portion containing the anionic catalyst, or alternatively, the two portions can be mixed and then the blowing agent added quickly.

The cocatalyst can be added to the lactam containing the anionic catalyst, or equally well, the cocatalyst can be dissolved in a separate portion of the lactam and the two portions of lactam mixed before polymerization is desired. For optimum operation of the process an inert gas, such as nitrogen, is bubbled through the molten lactam during the initial reaction of the base and lactam to form the anionic catalyst or lactam-base salt in order to remove any low molecular weight compound formed, such as water, and in order to prevent oxidation. Alternatively, this reaction of the lactam with base can be carried out under reduced pressure in which case the low molecular weight compound is distilled from the lactam.

The process of this invention is operable in the presence of various fillers, reinforcing agents, antioxidants, plasticizers, other resins (e.g., styrene, acrylic, nylon, polyether), colorants, other surfactants, and the like.

The invention is more thoroughly illustrated by the following examples in which parts and percentages are by weight unless otherwise indicated.

EXAMPLES

The procedure for determining the speed of a cocatalyst is as follows:

ε-Caprolactam (40 g.) is heated to 80° C. and 0.255 g. of NaH/white mineral oil (50/50) by weight is added. The lactam is sparged with nitrogen at a flow rate of 750 ml./min. and heated to 150° C. The cocatalyst (0.3 mole percent based on lactam) is added and nitrogen sparging continued for 15 seconds then stopped. The time is measured from the addition of the cocatalyst until the viscosity of the mix increases to the point where it would no longer flow when the tube is tilted at 45° to the horizontal. This time is called the "no-flow time."

EXAMPLE 1

Formulation:                                                Parts
   Dry caprolactam A _____ 40
   Dry caprolactam B _____ 40
   Disodium N-lauryl β-iminodipropionate
      ("Deriphat" 160) _____ 1.2
   Toluene 2,4-diisocyanate-caprolactam
      adduct (0.1 mole percent) _____ 0.28
   2,2,4-trimethyl-3-hydroxy-3-pentenoic acid
      β-lactone (TMBL (0.4 mole percent _____ 0.40
   53% NaH in white oil (1.5 mole percent) ___ 0.48
   Dodecenylazide _____ 0.65

Procedure:

The NaH-oil is added to dry caprolactam A in a tube at 125° C., and the melt is sparged with $N_2$ and heated to 150° C. Disodium N-lauryl β-iminodipropionate is dissolved in this melt with nitrogen agitation.

Caprolactam B and toluene 2,4-diisocyanate-caprolactam adduct are agitated in a tube with $N_2$ and adjusted to 150° C. TMBL is injected into this melt, and the solution is sparged 5 seconds with nitrogen. The A and B mixes are combined at 150° C., the combined melt is sparged with nitrogen for 25 seconds and dodecenyl azide is injected into the mixture and the combined mixture is sparged with nitrogen in order to blend it. The sparger is withdrawn from the contents of the test tube and positioned in such a way that the atmosphere above the polymerizing and foaming composition is kept free of air by nitrogen blanketing. After 10 minutes, the foamed cylinder is removed from the tube. The foam has a density of 0.47 g./cc., a uniform cell structure, and an average cell size of about 8 mils.

When an equal amount of potassium stearate is substituted for "Deriphat" 160, it is significant to note that the average cel size is considerably larger, of the order of about 15 mils.

EXAMPLE 2

The procedure described in Example 1 is repeated employing "Deriphat" 160 but substituting an equimolar quantity of a mixture of dimethyl benzyl azides containing 73% 3,4 isomer, 23% 2,3 isomer, and 3% of the 2,4 and 2,6-isomers for the dodecenyl azide. Similar results were obtained.

EXAMPLE 3

This process was the same as that described in Example 1 with the exception that the "Deriphat" 160 charged is only 0.4 part, or alternatively expressed, 0.5 part per hundred parts of caprolactam. The foam thus obtained has a density of 0.46 g./cc., a smooth lustrous skin, and an average cell size of about 15 mils.

When 0.5 part of potassium stearate is used as the surfactant instead of "Deriphat" 160, the foam has a density of 0.48 g./cc., a rough pimply surface, and a cell size averaging about 25 mils.

EXAMPLE 4

The formulation and procedure are the same as that described in Example 1 with the exception that "Deriphat" 154 (disodium salt of N-tallow (predominantly stearyl) β-iminodipropionate) is substituted for "Deriphat" 160. The foam obtained has a density of 0.45 g./cc., a very smooth skin, and an average cell size of about 7 mils.

EXAMPLE 5

This example illustrates the upgrading of a soap surfactant system by substituting a surfactant coming within the scope of those described herein for a minor proportion of soap.

The formulation and procedure of this example are the same as that described in Example 1, with the exception that the surfactant system employed is 0.2 gram of the disodium salt of N-tallow (predominantly stearyl) β-iminodipropionate, i.e., "Deriphat" 154, plus 0.4 gram of potassium stearate. The foam thus obtained has a density of 0.47 g./cc., a moderately smooth skin, and an average cell size of 9 mils.

When the sole surfactant is 0.6 gram of potassium stearate, the skin is rougher than with the combination of surfactants, and the average cel size is increased to about 18 mils.

EXAMPLE 6

Formulation:

| | Parts |
|---|---|
| Dry caprolactam A | 135 |
| Dry caprolactam B | 135 |
| "NonFerAl" (precipitated CaCO$_3$) | 135 |
| Disodium N stearyl β-iminodipropionate ("Deriphat" 154) | 0.675 |
| 53% NaH in white oil (1.5 mole percent) | 1.63 |
| Poly[2,2-propanebis(4-phenyl carbonate)] ("Lexan" 105 polycarbonate resin) | 0.61 |
| 2,2,4-trimethyl-3-hydroxy-3-pentenoic acid β-lactone (TMBL) | 1.34 |
| Dodecenyl azide | 2.16 |

Procedure:

The NaH-oil is added to dry caprolactam A in a tube at 125° C., the melt is sparged with nitrogen and heated to 150° C. Disodium N-stearyl β-iminodipropionate is dissolved in this melt with nitrogen agitation.

Caprolactam B, the NonFerAl, and poly[2,2-propanebis(4-phenyl carbonate)] are agitated in a tube with nitrogen and adjusted to 150° C. The TMBL is injected, and the slurry is sparged 5 seconds with nitrogen. The A and B mixes are combined, dodecenyl azide is injected into the combined mixes, agitation with N$_2$ to mix is continued for 10 seconds, and the mix is poured into a stainless steel sheet mold heated by 63 p.s.i. gage steam. After 10 minutes, the mold is opened to remove the foamed sheet. The foam has a density of 0.71 g./cc., a smooth, fine-textured skin, and a fine, uniform cell structure.

When potassium stearate is used as the surfactant at the same 0.25 part per hundred parts of caprolactam level instead of disodium N-stearyl β-iminodipropionate, the foam density of 0.76 g./cc., the skin texture is grainy in appearance, and the cell structure is much coarser than for the "Deriphat" foam.

EXAMPLE 7

Formulation:

| | Parts |
|---|---|
| Dry caprolactam A | 150 |
| Dry caprolactam B | 150 |
| NonFerAl (precipitated calcium carbonate) | 150 |
| Disodium N - stearyl β - iminodipropionate ("Deriphat" 154) | 4.5 |
| Poly[2,2 - propanebis(4 - phenyl carbonate)] ("Lexan" 105) | 2.70 |
| 55% NaH in white oil | 2.08 |

Procedure:

The NaH-oil is added to the dry caprolactam A at 125° C., the melt is sparged with butane to 150° C., and the "Deriphat" 154 is dissolved with further butane agitation.

Caprolactam B, the NonFerAl, and poly[2,2-propanebis(4-phenyl carbonate)] are agitated in a tube with butane and adjusted to 150° C. The A and B mixes are combined and mixed for 7 seconds with butane before being poured into a sheet mold heated by 60 p.s.i.g. steam. After 10 minutes, the mold is opened to remove the foamed sheet. The very stiff foam has a density of 0.74 g./cc. and a fine and uniform cell structure.

The procedure of this example is repeated substituting an 80/20 by weight mixture of laurolactam and ε-caprolactam. Similar results are obtained.

The procedure of this example is repeated substituting disodium n-tetradecyl-β-iminodipropionate for the disodium n-stearyl-β-iminodipropionate on an equimolar basis. Similar results are obtained.

EXAMPLE 8

This example shows upgrading of another surfactant ("Dowfax" 9N40) by concomitant use of a surfactant of the present invention.

Formulation:

| | Parts |
|---|---|
| Dry caprolactam A | 40 |
| Dry caprolactam B | 40 |
| Dodecenyl azide (DDA) | 0.65 |
| Toluene 2,4 - diisocyanate-caprolactam adduct (0.1 mole percent) | 0.28 |
| 2,2,4-trimethyl-3-hydroxy-3-pentenoic acid β-lactone (TMBL) (0.4 mole percent) | 0.40 |
| 53% NaH in mineral oil (1.5 mole percent) | 0.48 |
| Disodium N - stearyl β - iminodipropionate ("Deriphat" 154) | 0.2 |
| "Dowfax" 9N40 * | 0.4 |

*"Dowfax" 9N40=Nonylphenol-40 mole ethylene oxide adduct.

Procedure:

The NaH-oil is added to the lactam A melt at 125° C., the melt is sparged with nitrogen to 150° C., and the "Deriphat" plus "Dowfax" 9N40 detergent combination is dissolved by further nitrogen sparging.

The lactam B and toluene diisocyanate are adjusted to 150° C. by nitrogen sparging, and the TMBL is injected into the melt.

The A and B mixes are combined and mixed by nitrogen sparging at 150° C. for 25 seconds. The foaming agent, dodecenyl azide, is injected and the total mix is agitated with nitrogen at 150° C. until the melt becomes quite viscous (52 seconds from the time of combining the mixes). The nitrogen sparge tube is removed to allow the foaming to occur undisturbed. After 10 minutes the foamed cylinder is removed from the tube mold. The foam thus obtained has a density of 0.48 g./cc. and a fine uniform cell structure.

From the above description and specific examples in the application it can be seen that the particular surfactants employed in the anionic polymerization of lactams, quite unexpectedly, produced results in product quality that are far superior to other foamed polylactams made without the benefit of employing during polymerization and foaming the specific surfactants disclosed. The invention teaches an effective means for obtaining a polylactam foam having a cell structure finer and more uniform than those known prior to this invention; it provides a product having a smooth outer surface and, in addition, the surfactant increases foaming efficiency.

I claim:

1. In a process for the polymerization of lactams to foamed polylactams which comprises heating under substantially anhydrous conditions a lactam in the presence of a lactam-base salt, adding a cocatalyst capable of promoting polymerization at a temperature below the melting point of the polymer and a blowing agent, the improvement which comprises conducting said polymerization in the presence of from about 0.15 percent to about 1.5 percent of a surfactant having the structure $$RN(CH_2CH_2COOM)_2$$

wherein R is an aliphatic hydrocarbon having from 10 to 20 carbon atoms and M is a salt-forming cation.

2. A process according to claim 1 wherein the salt-forming cation is selected from the group consisting of alkali and alkaline earth metals.

3. In a process for the polymerization of ε-caprolactam to foamed polycaprolactam which comprises heating under substantially anhydrous conditions said ε-caprolactam in the presence of a lactam-base salt, adding a cocatalyst capable of promoting polymerization at a temperature below the melting point of the polymer and a blowing agent, the improvement which comprises conducting said polymerization in the presence of from about 0.15 percent to about 1.5 percent of a surfactant having the structure $RN(CH_2CH_2COOM)_2$ wherein R is an aliphatic hydrocarbon having from 10 to 20 carbon atoms and M is a salt-forming cation.

4. A process according to claim 3 wherein the aliphatic hydrocarbon contains 12 to 18 carbon atoms.

5. A process according to claim 3 wherein the salt-forming cation is an alkali metal.

6. A process according to claim 3 wherein the salt-forming cation is sodium.

7. A process according to claim 3 wherein the surfactant is n-dodecyl-$N(CH_2CH_2COONa)_2$.

8. A process according to claim 3 wherein the surfactant is n-tetradecyl-$N(CH_2CH_2COONa)_2$.

9. A process according to claim 3 wherein the surfactant is n-stearyl-$N(CH_2CH_2COONa)_2$.

10. A polycaprolactam composition made by the process of claim 1 comprising foamed poly-ε-caprolactam and from about 0.15 percent to about 1.5 percent of a surfactant having the structure $RN(CH_2CH_2COOM)_2$ wherein R is an aliphatic hydrocarbon having from 10 to 20 carbon atoms and M is a salt-forming cation.

References Cited

UNITED STATES PATENTS

| | | | |
|---|---|---|---|
| 2,629,698 | 2/1953 | Sterling | 260—2.5 |
| 2,926,108 | 2/1960 | Andersen | 106—14 |
| 2,950,261 | 8/1960 | Buchholz et al. | 260—2.5 |
| 3,017,391 | 1/1962 | Mottus et al. | 260—2.5 |
| 3,232,892 | 2/1966 | Fisher | 260—2.5 |
| 3,322,696 | 5/1967 | Fisher et al. | 260—78 |

FOREIGN PATENTS 918,059  2/1963  Great Britain.

MURRAY TILLMAN, *Primary Examiner.*

SAMUEL H. BLECH, *Examiner.*

W. J. BRIGGS, *Assistant Examiner.*